A. A. BENSON.
SPEED INDICATING DEVICE FOR MOTOR VEHICLES.
APPLICATION FILED FEB. 23, 1916.

1,207,126.

Patented Dec. 5, 1916.
2 SHEETS—SHEET 1.

WITNESSES:
F. C. Matheny
E. Peterson

INVENTOR
Ary A. Benson
BY
Pierre Barnes
ATTORNEY

A. A. BENSON.
SPEED INDICATING DEVICE FOR MOTOR VEHICLES.
APPLICATION FILED FEB. 23, 1916.

1,207,126.

Patented Dec. 5, 1916.
2 SHEETS—SHEET 2.

WITNESSES:

INVENTOR
Ary A. Benson
BY
Pierre Barnes
ATTORNEY

UNITED STATES PATENT OFFICE.

ARY A. BENSON, OF SEATTLE, WASHINGTON, ASSIGNOR TO BENSON, FLICK & SOLBERG, INC., OF SEATTLE, WASHINGTON, A CORPORATION OF WASHINGTON.

SPEED-INDICATING DEVICE FOR MOTOR-VEHICLES.

1,207,126.  Specification of Letters Patent.  Patented Dec. 5, 1916.

Application filed February 23, 1916. Serial No. 79,865.

*To all whom it may concern:*

Be it known that I, ARY A. BENSON, a citizen of the United States, residing at Seattle, in the county of King and State of Washington, have invented certain new and useful Improvements in Speed-Indicating Devices for Motor-Vehicles, of which the following is a specification.

This invention relates to improvements in speed indicating devices for motor vehicles and is an improvement on a speed indicating device shown and described in United States patent application Serial No. 13,539, filed by myself and others on March 10, 1915.

The object of this improvement is to provide apparatus for recording the rate of speed at which a motor vehicle was traveling at the time of a collision, such apparatus being intended for use in connection with the speed-indicating devices described in the application above referred to, although it may obviously be used independently of such devices if it is desired to do so.

The invention consists in the novel construction, adaptation and combination of parts, as will be more clearly described in the following specification, illustrated in the accompanying drawings and finally set forth in the appended claims.

Figure 1:
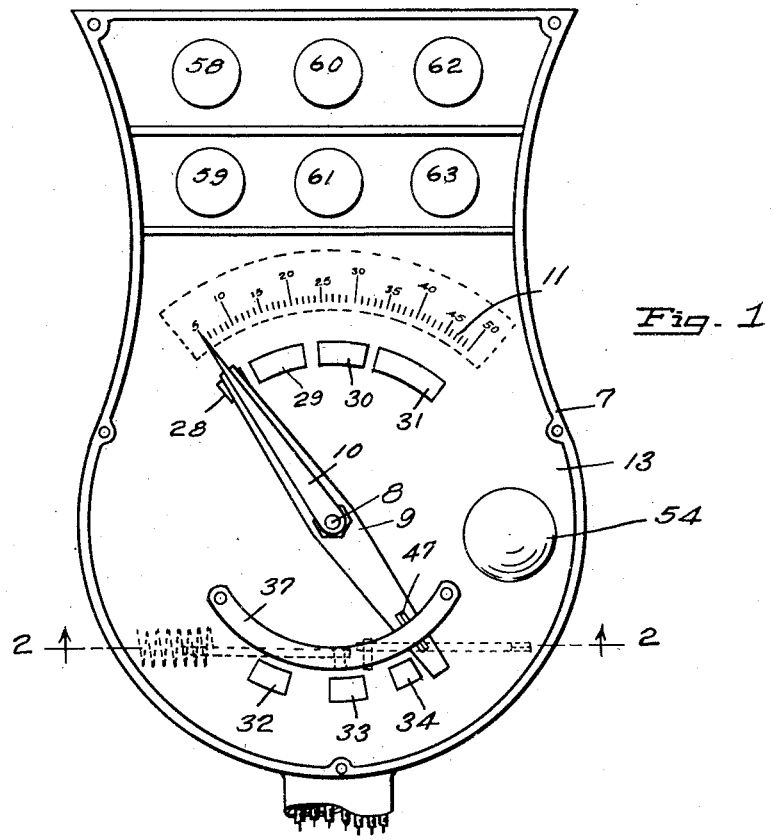
Figure 2:
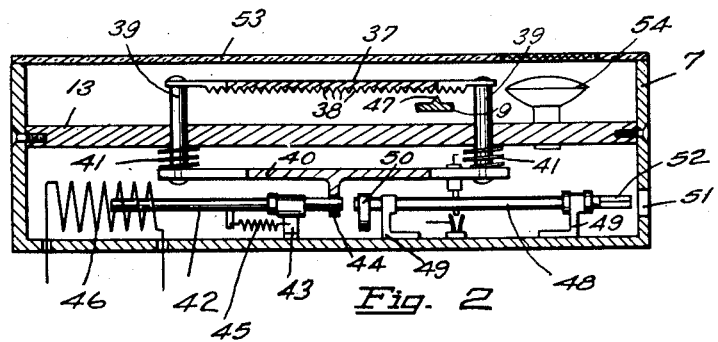
Figure 3:
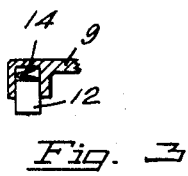
Figure 4:
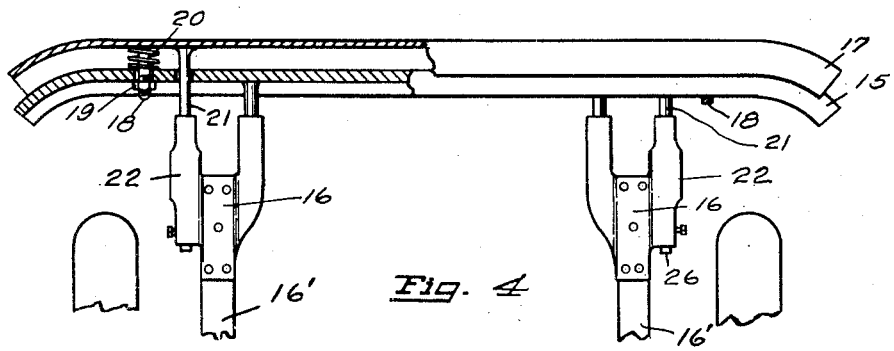
Figure 5:
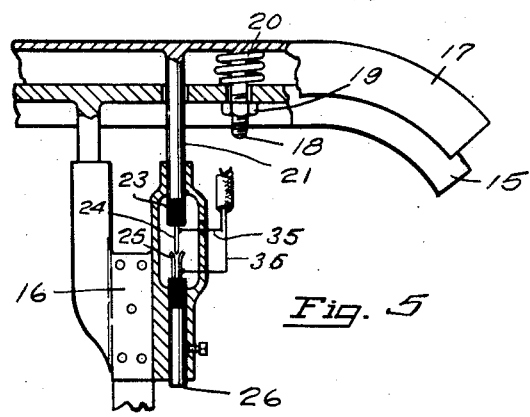
Figure 6:
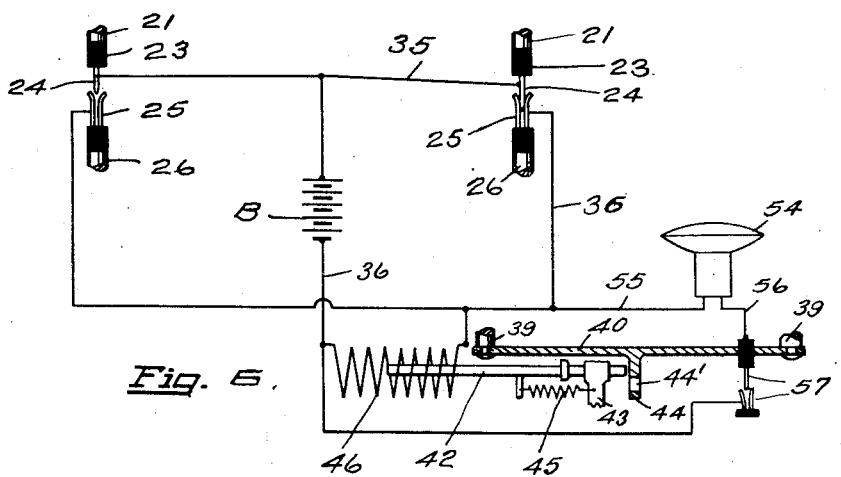

In the accompanying drawings, Figure 1 is a plan view of a signal embodied in this invention and adapted to be placed on the cowl-board of an automobile; Fig. 2 is an enlarged view in cross section on broken line 2—2 of Fig. 1, certain parts being shown in elevation; Fig. 3 is a fragmentary sectional view of a detail of the invention; Fig. 4 is a view partly in plan and partly in section, of a collision-bar embodied in this invention; Fig. 5 is an enlarged sectional view of one end portion of such collision bar and Fig. 6 is a somewhat diagrammatic view illustrating electrically-controlled apparatus embodied in the invention.

Referring to the drawings, throughout which like reference numerals indicate like parts, the numeral 7 indicates a casing within which may be disposed speedometer mechanism of a form already described in the copending application above referred to, such mechanism being connected with a shaft 8 whereon is mounted an arm 9 and a pointer 10 that is adapted to move over a dial 11 to indicate the rate of speed at which a vehicle travels.

The ends of the arm 9 are provided with contact brushes 12 that are directed downwardly toward a dial 13 and are held in contact with such dial by springs 14, see Fig. 3, whereby as the arm 9 is turned, the brushes may move over contacts 28, 29, 30, 31, 32, 33 and 34 that are identical with the similarly numbered contacts in application Serial No. 13,539 to make and break contacts with lamps that indicate various rates of speed of the motor vehicle.

Within the upper portion of the casing 7 are lamps 58, 59, 60, 61, 62 and 63 that are identical in function and mode of operation with similarly numbered lamps in application Serial No. 13,539 and are similarly connected with the contacts 28 to 34 inclusive and with a source of supply of electrical current.

15 is a bumper that is mounted in brackets 16 on the front end $16^1$ of a car and 17 is a collision bar of substantially U-shaped cross section that is secured to the front of the bumper 15 adjacent each end thereof by stud bolts 18 that extend through holes in the bumper-bar 15 and are provided with nuts 19 whereby the distance of the collision bar 17 from the bumper bar 15 may be varied. Helical compression springs 20 are interposed on the bolts 18 between the collision bar and the bumper bar and normally serve to keep the two bars spaced apart.

The collision bar 17 is further provided near both ends with contact posts 21 that extend rearwardly through holes in the bumper bar 15 and project within switch housings 22 in the brackets 16. The posts 21 terminate in an insulated portion 23 to which is secured a switch blade 24 that is adapted when the collision bar is moved rearwardly, to make electrical contact with other switch blades 25 on adjustable contact bar 26 and close a circuit formed by electric circuit wires 35 and 36 that may be connected with battery B.

37 is a curved plate having a serrated or notched under surface 38 and mounted upon two perpendicular bars 39 that are slidable through the dial 13 and are provided on their lower ends with a yoke 40 between which yoke and the dial 13 are interposed two very light compression springs 41.

The yoke 40 is normally supported in the position shown in Fig. 2 by a bar 42 that is slidable within guides 43 and passes through a hole 44¹ in a lug 44 on the central portion of the yoke. The bar 42 is connected with a helical tension spring 45 that tends to move it into engagement with the yoke 40 and is further associated with a solenoid 46 that has sufficient strength when energized, to overcome the tension of the spring 45 and withdraw the bar 42 from the hole 44¹, thus permitting the yoke 40 and plate 37 to be moved by the springs 41 into the position shown in Fig. 6 and causing the notched portion 38 of the plate 37 to engage with a V-shaped lug 47 on the bar 9 and hold the bar 9 and pointer 10 in the exact position in which they were located when the solenoid was energized.

48 is a shaft that is mounted in brackets 49 and is provided with a cam 50 on its inner end that is adapted to engage with and lift the yoke 42 when the shaft 48 is turned by a key (not shown) that may be inserted through a hole 51 in the casing 7 and fitted over the squared outer end 52 of such shaft.

The casing 7 is normally covered by a plate 53 that is preferably formed of glass and is transparent in the portions above the lamps 58 to 63 inclusive, and above the dial 11, such glass preferably is opaque in all other parts except above a lamp 54 which part is preferably colored red to warn the driver when his pointer is locked.

The lamp 54 is connected with the battery B by circuit wires 55 and 56 which lead through a switch 57 that is closed by the lowering of the yoke 42 and opened by the raising of such yoke (see Fig. 6) whereby lamp 54 is lighted only when the pointer 10 is locked by the dropping of plate 37.

In operation, the plate 37 is normally raised and the bar 9 is permitted to oscillate freely in response to a change in the rate of travel of the car, but if the collision bar 17 strikes an object, as a person or another automobile, then the contact bars 21 will be moved rearwardly and will close the circuit formed by the wires 35 and 36 thus energizing the solenoid 46 and causing it to withdraw the bar 42 and permit the plate 37 to drop downwardly onto the bar 9 and engage the lug 47 thus locking the pointer at the rate of speed indicated at the time of the collision, and enabling a person that inspects the car, as an officer, to tell the rate of speed at which the car was traveling when the collision occurred.

The circuit formed by the wires 35 and 36 is only closed during the time that sufficient pressure is exerted on the collision bar 17 to overcome the compression of the springs 20.

When the shaft 48 is turned, the cam 50 will engage the yoke 40 and lift the plate 37 thus freeing the bar 9 and permitting the pointer to return to its initial position. The solenoid 46 is connected with the battery B through the switches 24 and 25, see Fig. 6, in such a manner that the closing of either one or both of switches will energize the solenoid. This is an essential feature since it is possible for one end of the collision bar to strike an object, as a person, and close the switch on one side without affecting the switch on the opposite side.

The amount of pressure that is normally required to close the switches 24 and 25 may be varied by adjusting the bars 26 and screwing or unscrewing the nuts 19.

What I claim as my invention, is—

1. A device of the class described, comprising a speed indicator for motor cars, locking devices associated therewith, and means disposed on the front end of a motor car for locking said speed indicator when said motor car collides with an object.

2. A device of the class described, comprising a speed indicator for motor vehicles, devices for locking said speed indicator in any position, a collision bar disposed on the forward end of said motor vehicle, and means connected with said collision bar for operating said locking devices in response to a pressure against said collision bar.

3. A device of the class described, comprising a speed indicator for motor vehicles, devices for locking said speed indicator in any position, a collision bar disposed on the forward end of said motor vehicle, electrically-controlled apparatus for actuating said locking devices, and switch mechanism connected with said collision bar and with said electrically-controlled apparatus and adapted to be closed by a pressure exerted on said collision bar.

4. A device of the class described, comprising a signal box for a motor vehicle, a pointer provided therein, means for locking said pointer in any desired position, electrically controlled devices for actuating said locking means, switches, a collision bar on the forward end of said motor vehicle, and means connected with said collision bar for closing said switches.

5. A device of the class described, comprising a signal box for a motor car, a dial provided therein, a pointer movable over said dial, a plate disposed above said pointer and adapted to engage and lock said pointer, a bar supporting said plate, a solenoid to withdraw said bar, an electric circuit, a collision bar disposed on the forward end of a motor car, and switch mechanism associated with said collision bar and adapted to be closed by a pressure on said collision bar.

6. A speed indicator for motor vehicles comprising a casing, a dial provided therein, a pointer movable over said dial, a plate disposed above said pointer and adapted to engage and lock said pointer, posts supporting said plate, a yoke connecting said posts, a bar supporting said yoke, springs to move said plate downwardly onto said pointer, a solenoid to withdraw said bar, an electric circuit connected with said solenoid, a collision bar, switches interposed in said electric circuit, and means connected with said collision bar for closing said switches in response to a pressure exerted on said collision bar.

7. A speed indicator for motor vehicles, comprising a dial, a pointer movable over said dial, means for locking said pointer in any position, a collision bar extending crosswise of the forward end of said motor car, electrical devices controlling said locking means, an electric circuit, and switches disposed at each end of said collision bar to close said electric circuit in response to a pressure on said collision bar.

8. A speed indicator for motor vehicles, comprising a dial, a pointer, electrically controlled means for locking said pointer in any position, an electric circuit, means associated with the forward end of a motor vehicle for closing said circuit in response to a collision of said motor vehicle with a heavy object, and a lamp associated with said dial and adapted to be lighted when said pointer is locked.

9. A speed indicator for motor vehicles, comprising a dial, a pointer, a plate disposed above said pointer and adapted to lock said pointer, releasable means supporting said plate, springs to move said plate into engagement with said pointer, means for moving said plate out of engagement with said pointer, and electrically-controlled devices for actuating said plate-supporting means.

10. A device of the class described, comprising speed-indicating mechanism for motor vehicles, a collision bar disposed on the forward end of said motor vehicle, means connected with said speed-indicating mechanism and said collision bar and adapted to lock said speed-indicating mechanism in response to a pressure on said collision bar, and means for varying the amount of pressure required to move said collision bar and actuate said locking means.

Signed at Seattle, Washington, this 26th day of January, 1916.

ARY A. BENSON.

Witnesses:
HORACE BARNES,
E. PETERSON.